United States Patent [19]

Borne et al.

[11] 4,454,382

[45] Jun. 12, 1984

[54] STRUCTURE FOR FIXING A DEVICE ON A SUPPORTING CHANNEL BAR

[75] Inventors: André Borne, Villeurbanne; Henri Guernet, Lyons; André Marmonier, Bron, all of France

[73] Assignee: CGEE Alsthom, Levallois-Perret, France

[21] Appl. No.: 354,265

[22] Filed: Mar. 2, 1982

[30] Foreign Application Priority Data

Mar. 23, 1981 [FR] France ............................... 81 05728

[51] Int. Cl.³ ............................................ H01B 17/24
[52] U.S. Cl. ............................ 174/158 R; 339/198 GA
[58] Field of Search ............ 248/27.1, 72, 214, 221.4, 248/221.1, 222.3, 223.3, 225.2, 226.1, 226.3, 228, 239; 339/198 GA; 361/353, 417, 419, 420, 426, 426; 174/158 R

[56] References Cited

U.S. PATENT DOCUMENTS 4,268,108  5/1981  Debaigt ...................... 339/198 GA Primary Examiner—J. V. Truhe
Assistant Examiner—Greg Thompson
Attorney, Agent, or Firm—Sughrue, Mion, Zinn, Macpeak and Seas

[57] ABSTRACT

Means for fixing a device on supporting a channel bar comprise a leg (5), a fixing component (2) and a compression spring (3). The fixing component has a rod (12) and a body (11) which slide in a longitudinal guide (24) in the base (1) of a housing for said device to be fixed on the bar. Two recesses (9, 10) are provided in the base. The compression spring is installed in a partially compressed condition in the first recess (9) and the rod (12) passes through it, said rod forming shoulders (19) with the body. The end of the rod (12) is fitted with a pin (4). The fixing component has two hooks (13, 14) and a guide (15) which co-operates with a groove (27) of the base to make the fixing component captive.

3 Claims, 6 Drawing Figures

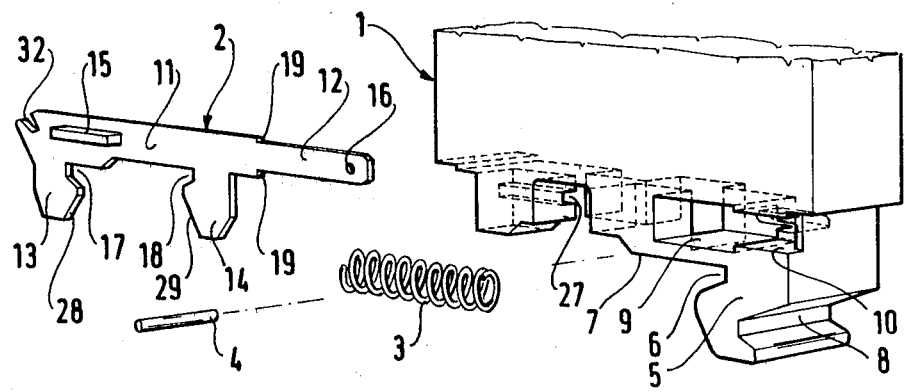
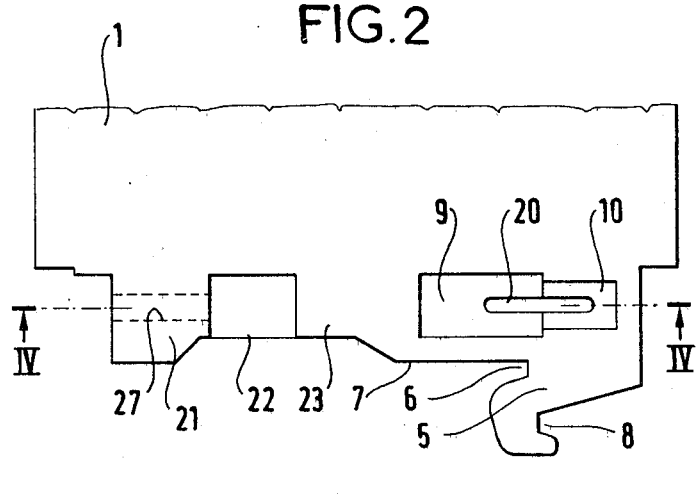
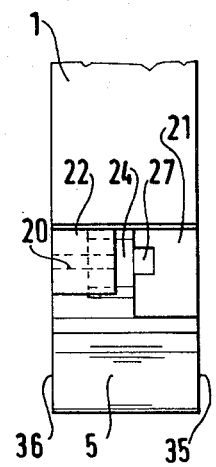
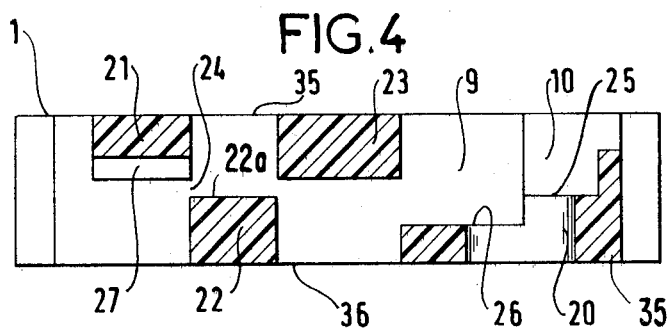

STRUCTURE FOR FIXING A DEVICE ON A SUPPORTING CHANNEL BAR

FIELD OF THE INVENTION

The invention relates to fixing devices and in particular electrical devices onto channel section bars having rims which may be outwardly or inwardly turned such as, for example, EN 50035 (G section bars) and EN 50022 ("hat" section bars, i.e. symmetrical channel section bars with outwardly turned rims).

BACKGROUND OF THE INVENTION

There are numerous sorts of hooked means for fixing electrical devices, e.g. connection terminals, circuit-breakers, terminal blocks, onto a support bar. The hooks are resilient and allow both installation on and removal from the supporting channel bar.

These fixing means usually form part of the electrical device and are situated at one end (or base) of an insulating housing thereof. Naturally, the hooks are made of the same substance as the housing. Said substance should impart some degree of resilience to the hooks.

One disadvantage of these fixing means resides in the fact that the hooks may break, thus making it impossible to fix the device which therefore becomes impossible to use.

Another disadvantage resides in the fact that the housing of the device must be made of an insulating substance which allows the hooks to be resilient, thereby making it impossible to use thermosetting substances such as, for example, some kinds of polyester resin, phenol melanins or the substance known under the trade mark "Bakelite".

Preferred embodiments of the invention provide hooked means for fixing a device on a supporting section bar in which means the hooks are rigid, and may thus be made of a thermosetting substance or of numerous other kinds of substance. The device may be detachably fixed either on a symmetrical channel bar e.g. of the EN 50022 type herein referred to as being of the "hat" type, or on an assymmetrical channel bar e.g. of the EN 50035 type herein referred to as being of the G type.

SUMMARY OF THE INVENTION

The invention provides means for fixing a device on a supporting channel bar of symmetrical or assymmetrical type, said means being located on a base of an insulating housing for the device and including hooks for fixing the device on a channel bar, wherein said means comprises a rigid leg, a fixing component, and a compression spring, the leg being situated near one end of the base and forming part of said base, the fixing component having a body, a first rigid hook and a second rigid hook and a rod which extends the body and is narrower than the body, the rod and the body defining shoulders therebetween, the first hook being situated at the end of the body furthest from the rod, the second hook being situated between the first hook and the rod, the base having a first recess and a second recess at its end nearest to the leg, the height of the first recess being equal to the height of the body and its length being such that the compression spring is installed partially compressed thereon, the second recess following the first recess and having a height equal to the depth of the rod, the base having at its end a longitudinal guide provided between two surfaces of the base and communicating with the first recess and the rod being provided with a pin beyond the compression spring which is compressed in the first recess in each case of assembling on a channel bar.

BRIEF DESCRIPTION OF THE DRAWINGS

An embodiment of the invention is described by way of example with reference to the accompanying drawings in which:

FIG. 1 is an exploded perspective view of fixing means in accordance with the invention;

FIG. 2 is an elevation of a component of the means illustrated in FIG. 1;

FIG. 3 is an end view which illustrates the component of FIG. 2 seen from the left-hand end;

FIG. 4 is a plan view seen from underneath along a cross-section IV—IV of the component in FIG. 2;

MORE DETAILED DESCRIPTION

Figure 5:
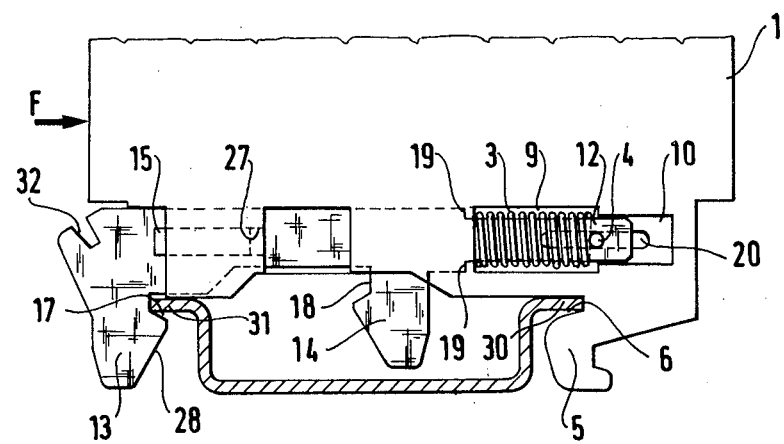
FIG. 5 is a side elevation which illustrates the means of FIG. 1 installed on a symmetrical channel bar herein referred to as a hat type channel bar.

The fixing means illustrated in FIGS. 1 to 6 is constituted by a base 1 of a housing of a unit which is to be fixed, a fixing component 2, a compression spring 3 and a pin 4.

The base 1 has a leg 5 near one edge, said leg forming a corner 6 with a lower surface 7 of the base, said corner being turned towards the opposite edge of the base; the leg 5 has a notch 8 turned towards the outside of the base. A first recess 9 is formed in the thickness of the base near the leg 5 and accommodates the compression spring 3 which is partially compressed, the length of the first recess being shorter than that of the compression spring when not compressed and longer than that of the compression spring when fully compressed. The first recess 9 is extended on its end nearest to the leg 5 by a second recess 10 whose function will be specified hereinafter; said second recess is also provided in the thickness of the base but it is narrower than the first recess.

The fixing component 2 has a body 11 which is extended on one side by a rod 12, with a first hook 13 situated at the end of the body furthest from the rod, a second hook 14 situated between the first hook and the rod, and a guide 15 projecting sideways from one surface of the body over part of the length thereof near the end furthest from the rod 12. The rod 12 has a hole 16 in which the pin 4 is engaged when the fixing means is assembled. The first hook 13 has a notch 17 and a ridge 28 turned towards the rod 12 and the second hook 14 has a notch 18 and a ridge 29 turned towards the first hook 13.

The body 11 whose end is extended by the rod and has a shoulder 19 on each side of the rod since the remainder of the body 11 is wider than said rod. The width of the body 11 is at least equal to the diameter of the compression spring 3 and is equal to the height of the first recess 9. The distance between the shoulders 19 and the hole 16 is at least equal to the length of the first recess 9 of the base. A hole 20 is provided in block 35, at recesses 9 and 10 for the pin 4 to pass through.

FIG. 4 is a view from underneath the base, sectioned along a line IV—IV in FIG. 2. It shows the end of the base in which hollows are formed so as to leave only blocks 21, 22, 23, 35. Block 22 determines, as do blocks 21 and 23, a longitudinal guide slot 24 in which the fixing component slides. The longitudinal guide slot is therefore located internally of the base, between the two side surfaces 35 and 36 of the base. The hollows at the ends of the base are provided only for facilitating unmoulding during manufacture of the housing of which the base 1 forms a part. A wall at the end 25 of the second recess 10 is located in line with edge 22a the block 22 so that one side surface of the rod 12 of the fixing component 2 comes against said wall 25 which thus constitutes one end of a longitudinal guide slot 24. The hole 20 opening to the first and second recesses (i.e. in walls 25, 26) allows the pin 4 to pass through and to move longitudinally when the fixing component 2 slides. The block 21 has a groove 27 in which the guide 15 of the fixing component 2 slides; said groove co-operates with the guide 15 to prevent any movement of the fixing component 2, other than sliding.

In this way, the fixing component 2, once assembled in the base, is held in the guide 24 and its only possible movement is a longitudinal sliding movement in the base; said movement is limited by the pin 4 in the direction of removal of the fixing component which is thus made captive.

Figure 6:
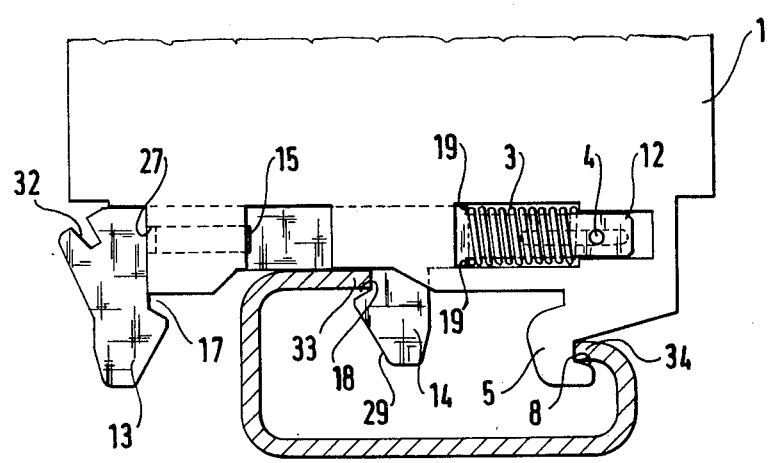
FIG. 6 is a similar side elevation which illustrates the means of FIG. 1 installed on an assymmetrical channel bar.

The assembled fixing means are shown in FIGS. 5 and 6. Assembly is as follow:

The compression spring 3 is inserted in the first recess 9 in which it is partially compressed; the rod 12 is inserted in the longitudinal guide slot 24 at the end nearest to the block 21; the fixing component 2 is slid so that the rod 12 passes through the compression spring 3 until the guide 15 comes into the groove 27. The first hook 13 is pressed to make the shoulders 19 of the fixing component 2 come into contact with the compression spring 3 which is thereby compressed. The hole 16 through the rod 12 thus moves away from the compression spring 3 and allows the pin 4 to be inserted therein. On releasing the pressure on the first hook 13, the compression spring 3 pushes the fixing component back until the shoulders 19 leave the first recess 9; the pin 4 is then practically in contact with the compression spring 3.

FIG. 5 illustrates the fixing component of the invention assembled on a symmetrical channel bar herein referred to as a "hat" section bar. It is assembled as follows. With one rim 30 of the bar engaged in the corner 6 of the leg 5, one end of the other rim 31 of the bar comes into contact with the ridge 28 on the first hook 13. By pressing the base 1 down towards the bar, the ridge 28 slides over the end of the rim 31 and the fixing component 2 moves towards the left (of FIG. 5) causing the compression spring 3 to become compressed by the pin 4. When the end of the rim 31 engages the notch 17 the fixing component 2 returns towards the right by the action of the compression spring 3 on the pin 4. As illustrated in FIG. 5, with the end of the rim 31 abutting in the bottom of the notch 17, the fixing component 2 does not return to its rest position, and the compression spring 3 is still compressed since it does not occupy the entire length of the first recess 9. In this way, the compression spring 3 exerts a return force on the fixing component 2 via the pin 4, said force applying the first hook 13 against the rim 31 of the bar. To release the base 1 from the bar, a tool such as a screw driver, for example, is engaged in a notch 32 of the first hook 13 so as to move the fixing component 2 towards the left and thereby release the rim 31 of the bar by pivoting the base on the rim 30.

Alternatively the base 1 itself can be pushed in the direction shown by an arrow F so as to compress the compression spring 3 since the pin 4 is stationary relative to the first hook 13; the rim 30 of the bar is thus released from the corner 6 by pivoting the base on the rim 31.

FIG. 6 illustrates a fixing means in accordance with the invention installed on an assymmetrical channel bar. A rim 34 of the bar is engaged in the notch 8 of the leg 5; the end of the other rim 33 of the bar comes into contact with the ridge 29 of the second hook 14; pressing the base 1 towards the bar slides the ridge 29 over the end of the rim 33 and the fixing component 2 moves towards the right of FIG. 6, causing the compression spring 3 to be compressed by means of the shoulders 19. When the end of the rim 33 is engaged in the notch 18, the fixing component 2 is returned towards the left due to the action of the compression spring 3 on the shoulders 19. As illustrated in FIG. 6, with the end of the rim 33 abutting in the bottom of the notch 18, the fixing component 2 does not return to its rest position, since the compression spring is still compressed and does not occupy the entire length of the first recess 9. In this way, the compression spring 3 exerts a force directed towards the left on the fixing component 2 and via the shoulders 19, said force applying the second hook 14 against the end of the rim 33 of the bar.

To release the base 1 of the bar, it is necessary only to press on the first hook 13. This causes the fixing component 2 and hence the second hook 14 to move towards the right and thus releases the rim 33 of the channel bar.

It will be observed that in the fixing means of the invention, the compression spring 3 which is installed compressed partially in the first recess 9 operates in the same way in the case of both bar sections, i.e. it is compressed when the base is installed on a bar of either shape, with the hook which co-operates with the channel bar being subjected to a force directed towards the rim of the bar which is in contact with the hook.

The fixing component 2 which slides in the longitudinal guide 24 formed in the thickness of the base 1 may be made of the same substance as said base, or if for mechanical reasons the longitudinal guide is narrow for example, it may be made of metal.

The recesses 9 and 10 may also pass completely through the base 1 without thereby going beyond the scope of the invention.

In the means provided by the invention of which an embodiment has just been described, the leg 5 and the hooks 13, 14 are rigid and there is no need for the hooks and the leg to be resilient to fix the housing on a bar. Thus even if they are made of a relatively elastic substance, they must be dimensioned so that they are not resilient.

The fact that the hooks and the leg are not elastic makes it possible to produce such housings from thermosetting substances.

We claim:

1. Structure for fixing a device on a supporting channel of symmetrical or assymmetrical type, said means comprising, in combination:
a base of an insulating housing,
said base comprising a rigid leg,
said rigid leg being situated near one end of the base, forming part of said base and depending therefrom,
a fixing component,
a compression spring, said fixing component having an elongated narrow body, a first rigid hook and a second rigid hook integral with said body and projecting outwardly from said body at longitudinally spaced positions to the same side of said body, a rod integral with said body and extending from one end thereof and being narrower than the body, such that the rod and the body define shoulders therebetween at their juncture, the first hook being situated at the other end of the body furthest from the rod, the second hook being situated between the first hook and the rod, the base having a first recess and a second recess aligned therewith at its end nearest to the leg, said compression spring being installed in said first recess, the height of the first recess being equal to the height of the fixing component body, and its length being such that the compression spring is installed partially compressed thereon, the second recess following the first recess and having a height equal to the height of the rod, said base including a longitudinal guide slot provided internally thereof between two opposed side surfaces of the base and communicating with the first recess, and said fixing component slidably positioned within said slot with said rod projecting through said compression spring, and said rod being provided with a pin on the end thereof extending beyond the compression spring, and said rod being of a length such that said compression spring is installed partially compressed thereon with said spring compressed in the first recess in the case of assembly on a channel bar.

2. Structure according to claim 1, wherein the shoulders and the pin are separated by a distance practically equal to the length of the first recess.

3. Structure according to claim 1, wherein the body has a projecting guide on at least one surface, and a groove provided in the base slidably receiving the guide so as to make the fixing component captive.

* * * * *